Aug. 24, 1948.　　　L. P. REESE　　　2,447,598
METHOD OF MAKING POTTERY MOLDS
Filed Oct. 2, 1943　　　　　　　　　4 Sheets-Sheet 1
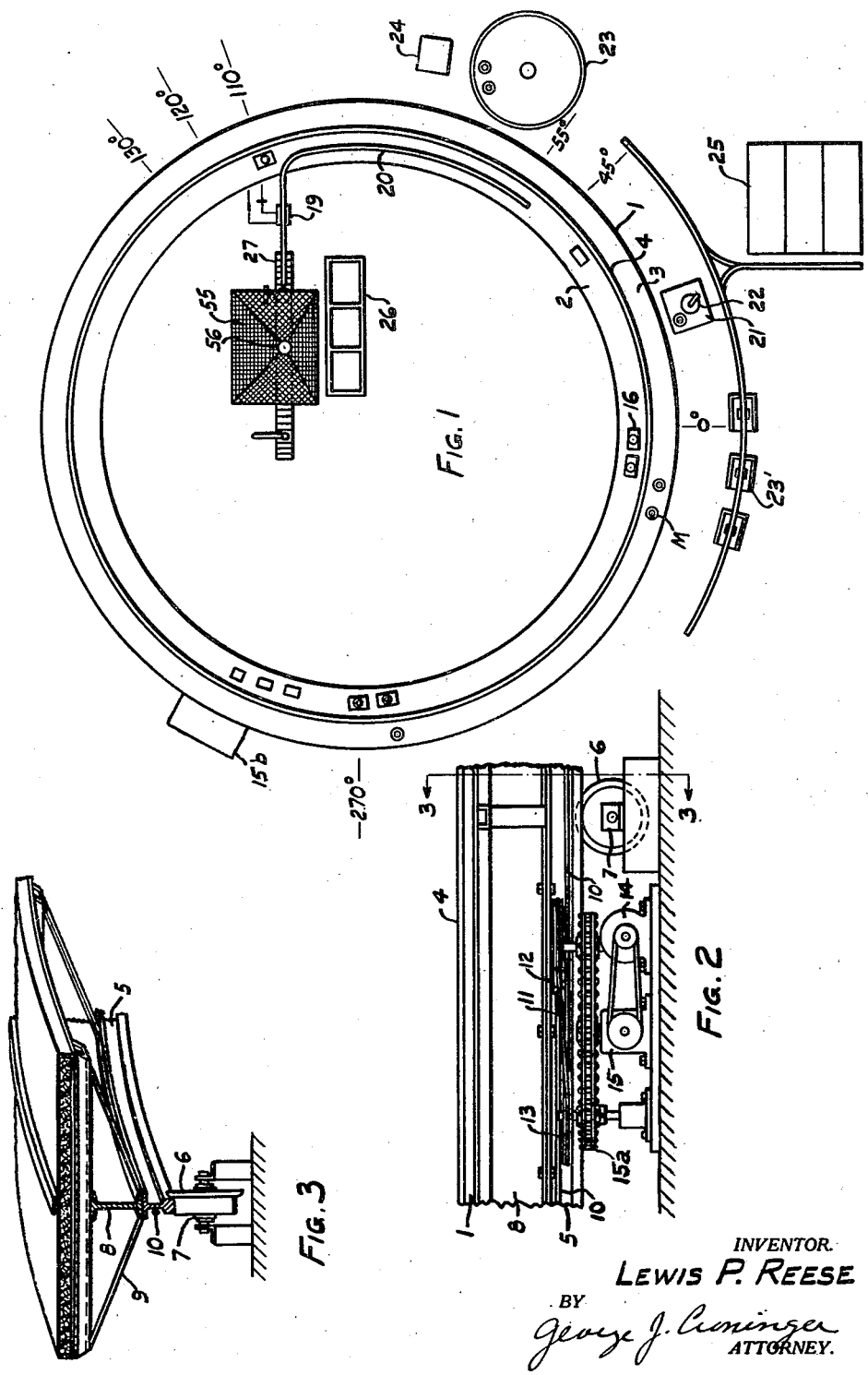
INVENTOR.
LEWIS P. REESE
BY
George J. Croninger
ATTORNEY.

Aug. 24, 1948.      L. P. REESE      2,447,598
METHOD OF MAKING POTTERY MOLDS
Filed Oct. 2, 1943      4 Sheets-Sheet 2
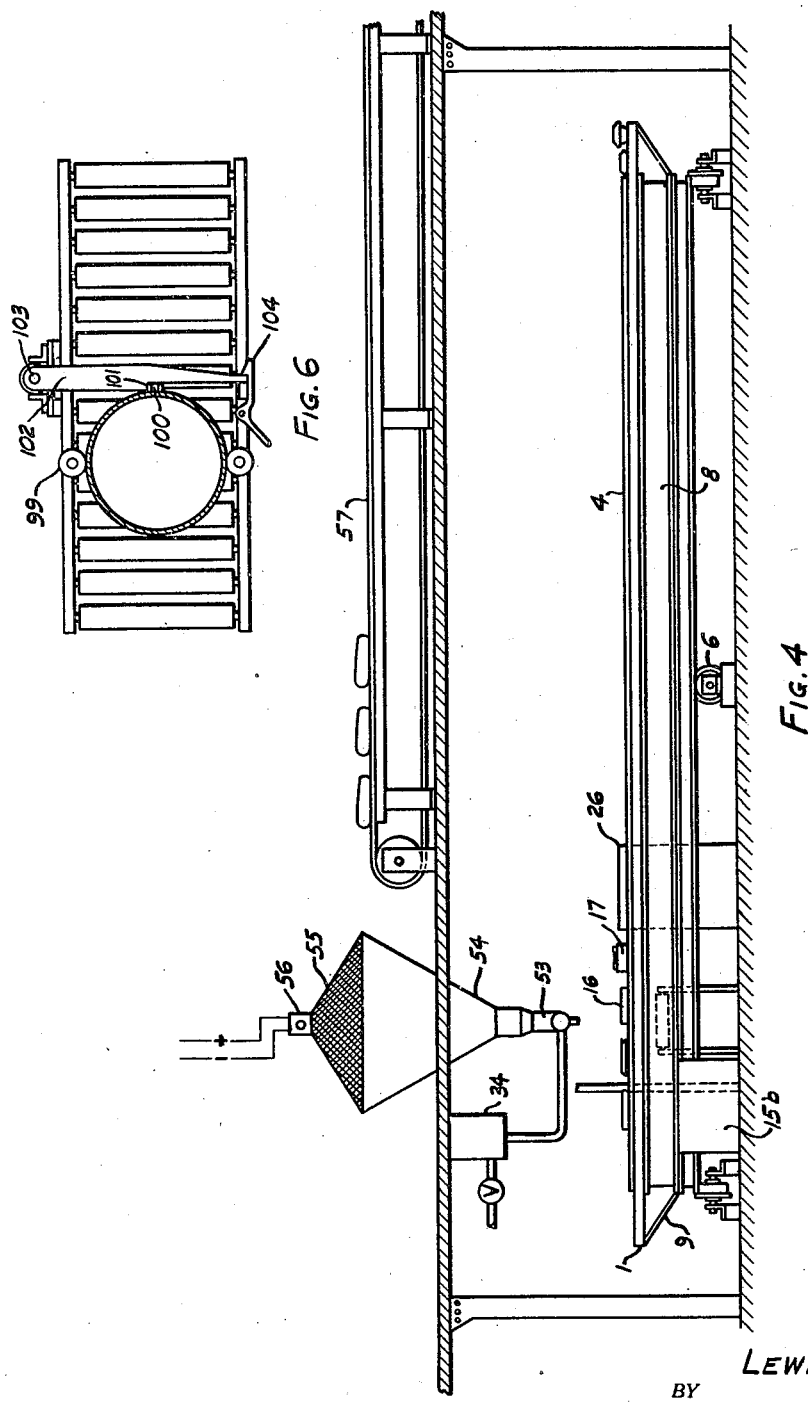
INVENTOR.
LEWIS P. REESE
BY
George J. Croninger
ATTORNEY.

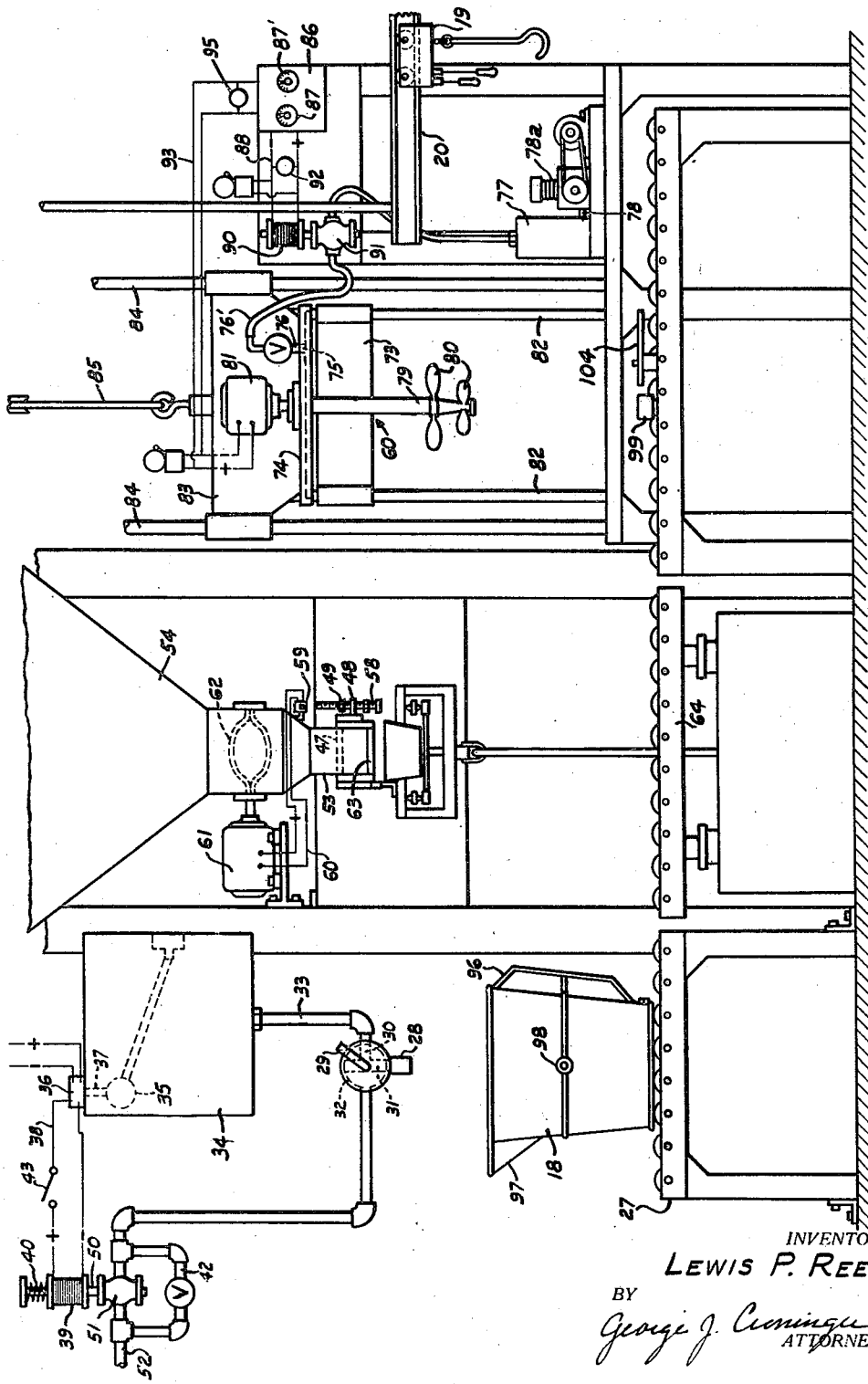

Aug. 24, 1948.                L. P. REESE                2,447,598
                    METHOD OF MAKING POTTERY MOLDS
Filed Oct. 2, 1943                                      4 Sheets-Sheet 4

INVENTOR.
LEWIS P. REESE
BY
George J. Croninger
ATTORNEY.

Patented Aug. 24, 1948

2,447,598

UNITED STATES PATENT OFFICE 2,447,598

METHOD OF MAKING POTTERY MOLDS

Lewis P. Reese, Scio, Ohio

Application October 2, 1943, Serial No. 504,746

2 Claims. (Cl. 25—155)

This invention relates to methods for manufacturing plaster molds such as those used in the production of pottery dinnerware and the like.

Potteryware of the above described class is now being made on high-speed automatic forming machinery in mass production fashion. This kind of equipment requires many more original and replacement molds for a given shape or shapes than would ordinarily be required in manual production. This is due to the large mold capacity of the machinery and the shorter recycling period which uses up the mold faster although there is no reduction in the ware yield per mold. Furthermore, machine molds must be accurately made and are held to closer tolerances than molds used in hand jiggering particularly in regard to seating surfaces by means of which the molds are supported and centered during fabricating operations.

The average "mold shop," where the molds are made, is primarily a manual institution, geared to manual production methods and operating at manual production speeds, with customary manual efficiency. The increased and more exact demands of automatic production has given rise to the problem of how to make molds faster, better and more economically than heretofore in order to avoid depreciation of the savings afforded by mass production economy in the manufacture of the ware.

The present invention has for its principal object the provision of new and improved mold making methods for increasing the output of the mold shop, enabling a higher degree of precision in the manufacture of molds and the introduction of economies intended to lower the overall cost of making molds. Other objects are to conserve manpower and reduce the need for skilled craftsmanship in the manufacture of molds; to improve and expedite mold making procedure and processes and to place the manufacture thereof on a mass production basis ideally suited to supply the demands of mass producing automatic pottery ware forming machinery.

One of the advantageous features of this invention resides in the fact that much of the skilled craftsmanship of the manual method is eliminated and unskilled labor may, to a great extent, be employed.

Another advantageous feature is that the invention will enable the continuous production of molds and the output within a given period can be accurately estimated and varied to meet requirements.

Another advantageous feature is that each worker may learn and become proficient at a particular operation as contrasted with procedure in the ordinary hand shop where each mold maker is a skilled craftsman and does all the necessary work himself.

Still another advantageous feature is that the procedure may be standardized which is an improvement over previous practice where each craftsman made the molds according to his own formula.

To implement the process, I have provided for a moving production line which is a new and different idea insofar as the manufacture of products of this class are concerned. The work is brought to the operators who are no longer required to lift, carry and perform other non-productive operations, but may apply their efforts wholly to mold making which enables greater concentration on and more rapid completion of the work. The matter of mixing the ingredients and supplying them to the moving production line is carried out in co-ordinated, semi-automatic fashion, the proportioning and mixing of ingredients being automatically controlled so that the procedure, as well as the mix, may be standardized and uniform for each successive batch thus insuring that the porosity, density, hardness and strength of the molds will be held to optimum and uniform specifications.

In the drawings:

Fig. 1 is a plan view of the preferred form of apparatus for carrying out my invention.

Fig. 2 is a side elevation of the driving apparatus for the conveyor of Fig. 1.

Fig. 3 is a vertical section through the mold conveyor with a fragment thereof shown in perspective.

Fig. 4 is an elevation of the apparatus of Fig. 1.

Fig. 5 is a front elevation of the apparatus for supplying and mixing the ingredients.

Fig. 6 is a plan view of the receptacle stabilizer located at the mixing station.

Figure 7:
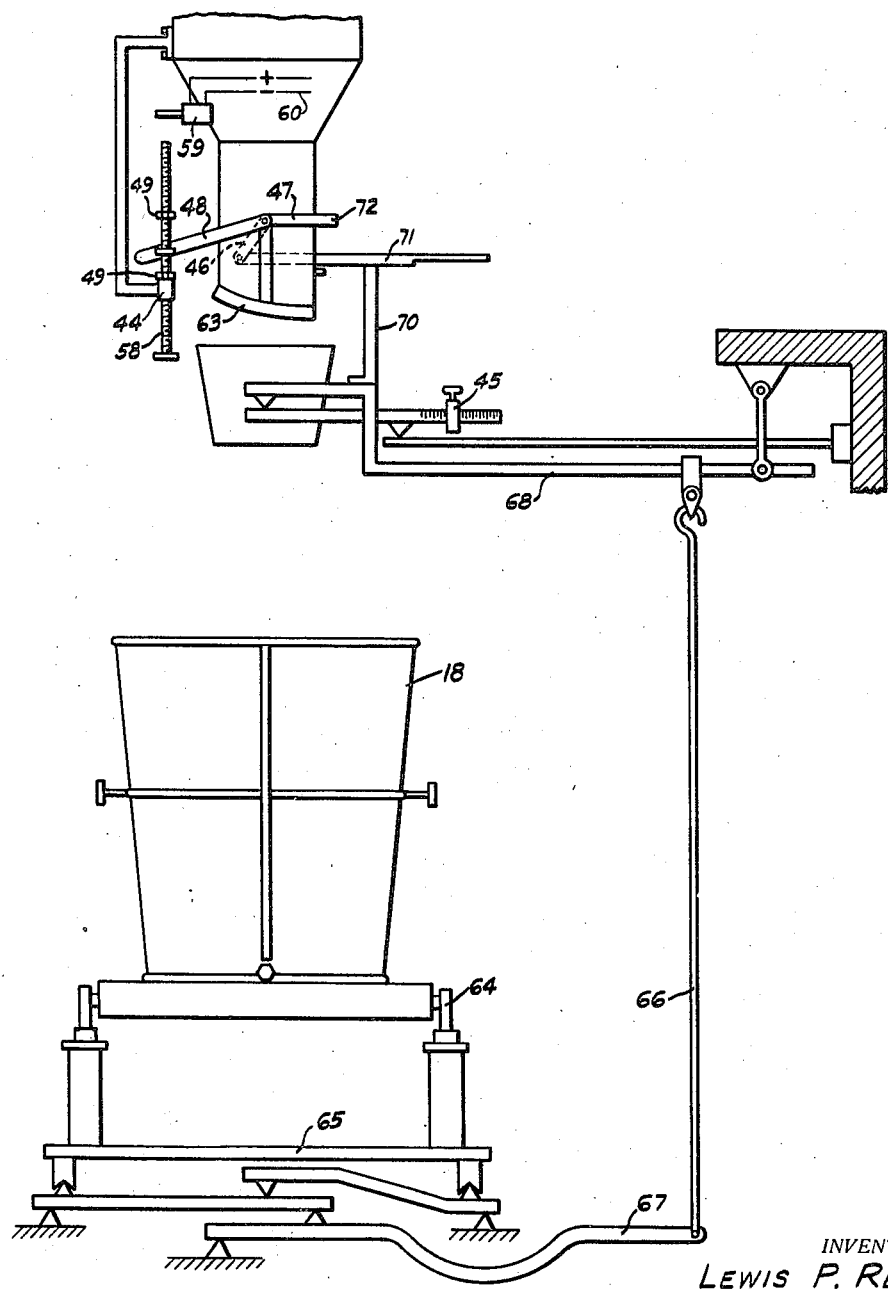
Fig. 7 is a side elevation, with some of the parts removed, of the apparatus for measuring the solid ingredients of the mixture.

With reference to Fig. 1, 1 is a circular table, whose upper surface is preferably made of wood or composition having a low coefficient of friction so that the mold cases will not slide and is divided into inner and outer circumferential zones 2 and 3 by a vertical, circular rib 4. The table, Fig. 3 is supported on a mono-rail 5 resting on several flanged wheels 6 supported from the floor on bearings 7. The wheels are spaced several feet apart, but the number and location of them depends upon the diameter of the table, however, it is desired that alternate wheels be turned so that the flange is reversed thus tending to minimize any tendency of the table to shift radially on the supports.

The rail 5 is attached to a circular I beam 8 from which braces and struts 9 angle upwardly to support the table top near the inner and outer perimeters. To rotate the table, a cable 10 is wound around the mono-rail and a loop 11 passed around pulleys 12 and 13 of the driving mechanism, Fig. 3, located alongside the structure. One pulley is higher than the other so that the cable will not rub where it crosses, and is driven by means of a motor 14 through variable speed transmission 15 and chain drive 15a. This mechanism is normally closed by a protective cover 15b as illustrated in Fig. 4.

In its commercial form, the table is preferably at least 50 feet in diameter but this figure is subject to variation to satisfy space and other requirements. The table top is made of ample width to accommodate the various items to be placed thereon and to permit the work to be expeditiously performed without crowding. It is desired that the table rotate slowly, that is to say to complete one revolution in anywhere between 15 and 50 minutes, depending on the diameter and the nature of the work and to rotate continuously without interruption for successive cycles.

The top surface 3 of the table between the center rib and the inner perimeter receives and supports the separable mold cases which may vary in number depending on the diameter of the table and the size of the cases. The cases may be diversified for making a diverse production as illustrated by flatware mold case 16, Fig. 4 and holloware mold case 17.

Starting at the 0° position, Fig. 1, the interior of the case 17 whose upper and lower halves are separated to expose the molding cavity, is soaped in conventional fashion as it travels past an operator or operators whose working range extends up to about the 45° position. It is customary to wipe the interior after it has been soaped and this may be done in this zone. The next zone, which may extend for approximately 10° more of rotation of the table up to about the 55° position is where the cases are reassembled in consecutive order by another operator. From the 55° position to the 110° position of the table is where the liquid plaster is poured into the mold cases and the mold shaken to settle the plaster and remove occluded air. Liquid plaster is supplied in containers or receptacles 18 carried by a hoist 19 from a curved overhead section monorail 20 on a radius with and concentric to the table in this zone, the topic of filling the containers with liquid plaster being discussed hereinafter.

Those cases requiring cores or sinkers, such as used to form the cavity in the base of flatware molds, are fitted with these devices between the 110° and 120° position of the table after the case has been filled and the plaster shaken down. Between the 120° and 130° positions the top of the case is scraped to smooth off the bottom surface of the mold, and sinkers may be removed here or further on. At the 270° position the sections of the cases are knocked apart and the molds removed and placed on the opposite or outside surface 2 of the table. From the 270° position around to the 0° position the interior of the cases are cleaned out by brushing and wiping and exposed to the drying influence of the air preparatory to soaping to complete the cycle. While the zones have been specified as extending between certain limits, it will be understood that these are arbitrary figures for the purpose of explaining the sequence of operations and the zones may be longer or shorter than given depending on the speed of rotation of the table and the time interval that may be safely allotted to the performance of any one of the operations described.

The molds M which are on the outside of the table travel around to a finisher's bench 21 where they are removed one after the other and placed on a finishing machine 22 which trues up the bottoms and seating surfaces after which they are put back on the table and are carried to an oiling position defined by a revolving table 23. Here, the molds are dipped in a tank 24 of oil and set on table 23 to drain. When the oil has soaked in they are removed and placed on the shelves of monorail cars 23' to be carried to storage bins 25 or directly to the mold exchanging station of the mass producing ware forming machinery. Any molds which require further trimming may be allowed to remain on table 1 to be carried around again to the trimming station.

The various operations described are performed manually by different operators stationed at the zones mentioned. Each operator is an expert at his assigned task and through repetition becomes highly proficient. As the efficiency of the operators increase, the speed of rotation of the table may be advanced to thereby raise production speed to its maximum value.

With regard to the apparatus for preparing the liquid plaster of which the molds are formed, it is well-known that plaster when mixed with water will set up in a short space of time and therefore I prefer to mix the materials in separate batches and in accordance with the requirements of the production line. I also prefer that the materials be mixed according to a predetermined formula and that the proportions be accurately measured and the quantities thereof and mixing time be accurately controlled, so as to produce an optimum mixture which will be uniform for sucessive batches.

For example, the receptacle 18 may have a 15 gallon capacity in which is mixed 8 gallons or 60 pounds of water and 100 pounds of plaster, preferably under vacuum and for a period of 2 to 3 minutes, the plaster being allowed a soaking period of 3 minutes after it is emptied into the water. Vacuum is preferably applied for not less than two minutes while the ingredients are being mixed to thereby expedite the removal of occluded air, however, this step may, if desired be omitted.

When an empty receptacle is returned by hoist 19 to be refilled, the operator disengages the bucket from the hoist and immerses it in a wash tank 26, Fig. 1, to clean the interior of any residue from the preceding batch. The receptacle is then placed in upright position on the left end of a gravity conveyor 27, Fig. 5, and pushed to the right to a position below nozzle 28. A measured quantity of water is discharged into the receptacle by turning control handle 29 to a position where passages 30 and 31 in valve disc 32 establish communication between tank pipe 33 and nozzle 28 to thereby empty overhead tank 34. As the water level drops in the tank, the level of float 35 drops, switch 36 normally held closed by actuating pin 37, opens and de-energizes circuit 38 to solenoid 39 and permitting the solenoid spring 40 to raise valve stem 50 to open valve 51 in water main 52. When the tank is empty, the operator throws the control 29 to a position where passage 31 establishes communication between the water main 52 and pipe 33 to thereby fill the tank. When the float 35 has risen to a pre-arranged level, switch 36 is closed and circuit 35 energized to actuate the solenoid and shut-off valve 51. The quantity of water in tank 1 may be varied by adjusting the position of the float 35 or the position of the switch. A by-pass 42 is for equalizing pressure on opposite sides of the valve. The circuit has a manual switch 43 for push-button control.

After the measured quantity of water has been discharged into the receptacle, it is moved to a position below the outlet end of tube 53. This tube leads upwardly to a large bin 54 provided with a screen top 55, Fig. 1, and vibrator 56 thereon. A conveyor 57, Fig. 4, located adjacent the bin or hopper delivers sacks of plaster thereto from a source of supply to be opened and dumped through the screen into the bin.

A measured quantity of plaster is fed through the tube by raising the control rod 58, Figs. 5 and 7, loosely inserted in guide 44 which closes switch 59 and energizes circuit 60 to motor 61 which rotates an impeller 62 inside the tube and causes the pulverized plaster to flow through the outlet whose gate 63 has been swung to open position by the raising of rod 58. The receptacle rests on the rollers of a section 64 of the gravity conveyor which is supported independently of the other sections on the platform frame 65 of a weighing scale, see Fig. 6. A pushrod 66 connected to one of the lower levers 67 is attached to an overhead beam 68 with which the balanced weight 45 is associated. When the amount of plaster for which the scale is set tips beam 68, a keeper 70 drops down and permits latch 71 to slide forward which permits the gate to drop by gravity to closed position. Rod 58 also drops down to its original position thus opening switch 59 and discontinuing the flow of plaster through the outlet.

Latch 71 is pivotally connected to an arm 46 formed as part of a pivoted bracket 47 around tube 53. The bracket has an actuating arm 48 pivotally received between set collars 49 on rod 58. When the rod is raised latch 71 is reset.

The receptacle is moved from the position below tube 53 to a position below mixer 69 and after a three minute interval (this interval may vary depending on the mix), the operator grasps frame 73 and pulls it down until the circular cover 74 rests firmly in leakproof sealed relation with the rim of the receptacle. The inside of the cover is lined with rubber or the like to effect the seal and has a vacuum port 75, connected by a valved pipe 76 and flexible conduit 76' to a tank 77 which is connected by pipe 78 to a motor driven evacuator 78a. 79 is the agitator shaft which passes through a bearing in frame 73 and the cover 74 and is provided with blades 80 to be driven by vertical motor 81 inverted on frame 73 to mix the materials in the receptacle. The frame 73 is supported for vertical movement in guide 82 and is counterbalanced by weights 83 vertically slidable on guides 84 and connected by cable 85 to frame 73.

After the cover is seated on the receptacle, the operator sets timer 86 by means of dial 87 to cause the deenergization of circuit 88 after a given period of time has elapsed, the turning of the dial acting to energize the circuit and cause solenoid 90 to open valve 91 in vacuum line 76' to place the interior of the receptacle under vacuum and also energize signal lamp 92. Being a conventional form of timer provided with a double set of controls the other dial 87' is turned to a given position which acts to energize circuit 93 either simultaneously with, subsequent or prior to the energization of circuit 88 to start motor 81 and the mixing operation and to illuminate signal lamp 95. Vacuum may be discontinued before or after mixing ceases which for example, may last for a period of three minutes for a batch of the proportions described. When the time has elapsed, the vacuum line is automatically shut off by the timer and mixing discontinued which also de-energizes the signal lamps to thereby indicate to the operator that the batch is done. After frame 73 is lifted, the receptacle is moved to the right on the gravity conveyor and pivotally connected to the hoist by trunnions 98 and the receptacle lifted and transported to the pouring station where it is moved along with the cases and tilted by handle 96 and liquid plaster poured through spout 97 into the open tops of the cases as hereinbefore described.

To prevent rotation of the receptacle whilst the material is being mixed therein, it is wedged between a pair of vertical rollers 99, Fig. 6, and lug 100 secured to the base of the receptacle is aligned with a notch 101 in stabilizing bar 102 pivotally connected at 103 to the conveyor frame and latched by dog 104 against movement. The receptacle is thus held against rotating during the mixing operation and is released thereafter by unlatching and swinging the stabilizer bar back out of the way.

I claim:

1. The method of forming articles from plaster, which comprises placing a plurality of molds on an annular rotatable table, continuously rotating said table to repeatedly carry the molds through a series of zones, and while said table is rotating, feeding liquid plaster to said molds in one zone in the path of movement of the molds, permitting the plaster to solidify in the molds in another zone adjacent said first mentioned zone, opening the molds and removing the plaster articles therefrom in still another zone and closing the molds preparatory to receiving another charge of liquid plaster, placing the plaster article removed from its mold on said table in a position radially outwardly of its mold, thereby conveying the plaster article to a finishing zone, and finishing the article in said zone.

2. The method of forming articles from plaster, which comprises placing a plurality of molds on an annular rotatable table, continuously rotating said table to repeatedly carry the molds through a series of zones, and while said table is rotating, feeding liquid plaster to successive molds in one zone in the path of movement of the molds, permitting the plaster to solidify in the molds in another zone adjacent said first mentioned zone, opening the molds and removing the plaster articles therefrom in still another zone, reconditioning the molding surfaces in another zone, and closing the molds preparatory to receiving another charge of liquid plaster, placing the plaster article removed from its mold on said table in a position radially outwardly of its mold, thereby conveying the plaster article to a finishing zone, and finishing the article in said zone.

LEWIS P. REESE.

REFERENCES CITED

The following references are of record in the file of this patent:

UNITED STATES PATENTS

| Number | Name | Date |
|---|---|---|
| Re. 746 | Jayne | June 28, 1859 |
| 57,919 | Jones | Sept. 11, 1866 |
| 767,393 | Doble | Aug. 16, 1904 |
| 808,599 | Crichfield | Dec. 26, 1905 |
| 886,768 | De Bogory | May 5, 1908 |
| 1,452,702 | Pipe | Apr. 24, 1923 |
| 1,505,867 | Cote | Aug. 19, 1924 |
| 1,595,369 | Wasmer | Aug. 10, 1926 |
| 1,598,400 | Simmonds | Aug. 31, 1926 |
| 1,608,690 | Ashenhurst | Nov. 30, 1926 |
| 1,690,208 | Ross et al. | Nov. 6, 1928 |
| 1,733,410 | Johnson | Oct. 29, 1929 |
| 1,740,711 | Pelton | Dec. 24, 1929 |
| 1,863,628 | Hanley, Jr., et al. | June 21, 1932 |
| 2,108,488 | Johns | Feb. 15, 1938 |
| 2,313,056 | Emerson et al. | Mar. 9, 1943 |